Figure 1:
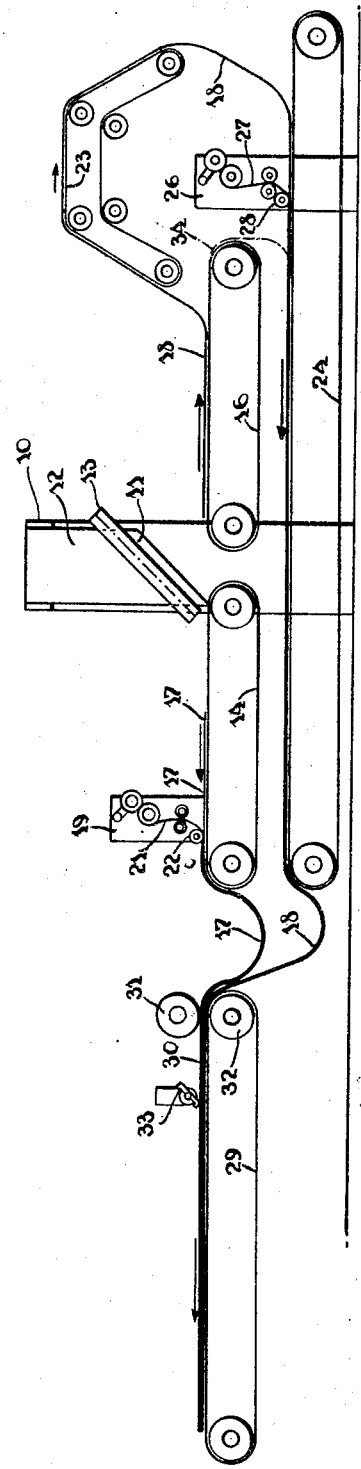

June 10, 1930.  E. F. MAAS  1,763,592
BAND BUILDING MACHINE
Filed April 9, 1928

Inventor
Eloy F. Maas.

Attorney

Patented June 10, 1930

1,763,592

UNITED STATES PATENT OFFICE

ELOV F. MAAS, OF AKRON, OHIO, ASSIGNOR TO THE GOODYEAR TIRE & RUBBER COMPANY, OF AKRON, OHIO, A CORPORATION OF OHIO

BAND-BUILDING MACHINE

Application filed April 9, 1928. Serial No. 268,495.

The invention relates generally to apparatus employed in the manufacture of pneumatic tire casings and it has particular relation to an apparatus of the above designated character for manufacturing laminated cord fabric bands which are employed in the construction of such casings.

One object of the invention is to provide a more economical apparatus for assembling strips of cord fabric material employed in the construction of laminated bands than the apparatus heretofore generally employed for such purposes.

Another object of the invention is to provide a band building machine in which one of the bias cutters, heretofore generally employed by such machines, is dispensed with.

Another object of the invention is to provide a band building machine requiring fewer attendants for its operation than was required by the machines of similar character heretofore employed.

The invention comprises an apparatus embodying a pair of oppositely driven aligned conveyors having a bias cutter of any suitable type disposed adjacent the adjacent ends of the conveyors. Bias cut strips are received from the bias cutter by attendants and are placed alternately in end to end relationship upon the aforesaid pair of conveyors. The ends of the strips placed upon the conveyor are spliced to the adjacent ends of the strips immediately preceding them. A third conveyor positioned beneath the aforesaid pair receives the strip from one of the conveyors, reverses and transports it to a region adjacent the delivering end of the other conveyor of the pair. Thereafter, the two strips are stitched together, thus forming a laminated band which is marked and divided into predetermined lengths by tearing the strips separately along obliquely disposed intersecting lines. Relatively thin rubber or squeegee strips may, if desired, be disposed upon corresponding faces of each of the bands.

For a better understanding of the invention, reference may now be had to the accompanying drawing, forming a part of this specification, in which:

Fig. 1 is a diagrammatical side elevational view of a preferred form of the apparatus embodying the invention.

In practicing the invention, a bias cutter 10 is employed for severing bias cut strips 11 successively from a quantity of cord fabric material 12, the end of which intermittently is projected beyond an obliquely disposed severing apparatus 13. The strips 11 alternately are positioned lengthwise upon the adjacent ends of a pair of oppositely driven and aligned conveyors 14 and 16. Strips 17 and 18 are constructed upon the conveyors 14 and 16 by stitching the ends of the strips 11 deposited alternately upon the conveyors to the adjacent ends of the aforesaid strips which previously have been deposited thereupon.

An applier 19 is disposed with respect to the conveyor 14 as to deposit a relatively thin and narrow rubber or squeegee band 21 upon the upper surface of a band 17. A roller 22 stitches the aforesaid bands together. The band 18, formed on the conveyor 16, is transported upwardly and away from the delivering end of the conveyor 16 by an elevating conveyor 23, from the opposite end of which it is received upon an end of a relatively long conveyor 24. The latter conveyor is disposed vertically below the conveyors 14 and 16 and is driven in the same direction as the conveyor 14. It will be noted that, not only is the direction of motion of the band 18 reversed, but that opposite surfaces thereof engage the conveyors 16 and 24 successively.

An applier 26, similar to the applier 19 and located beyond the end of the conveyor 16, likewise deposits a squeegee strip 27 upon the upper surface of the band 18. A stitching roller 28, similar to the roller 22, secures the bands 27 and 18 together. A conveyor 29, located beyond the delivering end of the conveyor 14 and aligned with respect thereto receives the strips 17 and 18 thereupon in superimposed relation where they are stitched together, to form a strip 30, by a roller 31 which cooperates with an end roller 32 of the conveyor 29.

A marking device 33, which is operated synchronously with respect to the operation of the aforementioned conveyors, intermittently engages the strip 30 thus indicating portions thereof having predetermined lengths. Attendants at a work station adjacent the conveyor 29 divide the strip 30, at points designated by the marking device 33, by tearing the strips 17 and 18 separately along obliquely disposed lines bisecting each other.

When the application of the squeegee strip 27, upon the upper surface of the band 18, is not required, the latter may be shunted below the elevating conveyor 23, as indicated at 34, and deposited directly upon the conveyor 24 from the delivering end of the conveyor 16.

From the foregoing description, it is apparent that the invention is embodied by a very efficient apparatus for forming bands employed in the construction of pneumatic tire casings, which apparatus is serviced by a single bias cutter whereas two such machines have been required by the apparatus heretofore employed. Since a bias cutter is capable of operating efficiently at relatively high speeds, it is possible, by employing the apparatus embodying the invention, to produce as many bands as have been produced heretofore by apparatus employed embodying an additional bias cutter and crew therefor. Obviously the invention makes possible a material decrease in the cost of original equipment and the skilled labor required in the operation thereof.

Although I have illustrated only the preferred form which the invention may assume and have described that form in detail, it will be apparent to those skilled in the art that it is not so limited but that various modifications may be made therein without departing from the spirit of the invention or from the scope of the appended claims.

What I claim is:

1. A band building machine comprising an oppositely driven pair of conveyors for transporting in opposite directions from a common source of supply positioned near their adjacent ends portions of continuous bands initially assembled thereupon, a conveyor for transporting the band from the delivering end of one of the pair of conveyors, adjacent the delivering end of the other, and means for stitching the two bands together.

2. A band building machine comprising an oppositely driven pair of aligned conveyors for transporting in opposite directions from a common source of supply positioned near their adjacent ends portions of continuous bands initially assembled thereupon, a conveyor for transporting the band from the delivering end of one of the pair of conveyors, adjacent the delivering end of the other, and means for stitching the two bands together.

3. A band building machine comprising an oppositely driven pair of aligned conveyors for transporting in opposite directions from a common source of supply positioned near their adjacent ends portions of continuous bands initially assembled thereupon, a conveyor immediately below the pair for transporting the band from the delivering end of one of the conveyors of the pair, adjacent the delivering end of the other, and means for stitching the two bands together.

4. A band building machine comprising an oppositely driven pair of aligned conveyors for transporting in opposite directions from a common source of supply positioned near their adjacent ends portions of continuous bands initially assembled thereupon, and a conveyor immediately below the pair for transporting the band from the delivering end of one of the pair of conveyors, adjacent the delivering end of the other.

5. A band building machine comprising an oppositely driven pair of conveyors for transporting in opposite directions from a common source of supply positioned near their adjacent ends portions of continuous bands initially assembled thereupon, an elevating conveyor adjacent the delivering end of one of the pair of conveyors for receiving the band therefrom, and a conveyor for transporting the band from the delivering end of the elevating conveyor, adjacent the delivering end of the other of the pair of conveyors.

6. A band building machine comprising an oppositely driven pair of conveyors for transporting in opposite directions from a common source of supply positioned near their adjacent ends portions of continuous bands initially assembled thereupon, an elevating conveyor adjacent the delivering end of one of the pair of conveyors for receiving the band therefrom, a conveyor for transporting the band from the delivering end of the elevating conveyor to the delivering end of the other of the pair of conveyors and means for applying a rubber strip upon the upper surface of the band supported by the last mentioned conveyor.

In witness whereof, I have hereunto signed my name.

Signed at Akron, in the county of Summit and State of Ohio, U. S. A., this 7th day of April, 1928.

ELOV F. MAAS.